No. 632,188. Patented Aug. 29, 1899.
F. KNOEFERL.
CAGE OR PLATFORM FOR USE IN DECORATING OR OTHER PURPOSES.
(Application filed Jan. 24, 1899.)
(No Model.)

Witnesses.
Benjamin Clark
Charles H. Briggs

Inventor:
Francis Knoeferl,
per: E. Eaton.
his Attorney.

UNITED STATES PATENT OFFICE.

FRANCIS KNOEFERL, OF LONDON, ENGLAND.

CAGE OR PLATFORM FOR USE IN DECORATING OR OTHER PURPOSES.

SPECIFICATION forming part of Letters Patent No. 632,188, dated August 29, 1899.

Application filed January 24, 1899. Serial No. 703,291. (No model.)

*To all whom it may concern:*

Be it known that I, FRANCIS KNOEFERL, a subject of the Queen of Great Britain, and a resident of Hampstead road, London, in the county of Middlesex, England, have invented certain new and useful Improvements in Cages or Platforms for Use in Decorating or other Purposes, (for which I have applied for a patent in Great Britain, No. 14,247, dated June 28, 1898,) of which the following is a full, clear, and exact specification.

This invention relates to improvements in cages or platforms for use when decorating, cleaning, or other purposes upon the outside or inside of buildings, the object being to so suspend and arrange the cage or platform as to enable it to be maintained in as nearly a horizontal position as possible when being moved in any direction.

For purposes of illustration I will now refer to the annexed drawings, in which—

Figure 1:
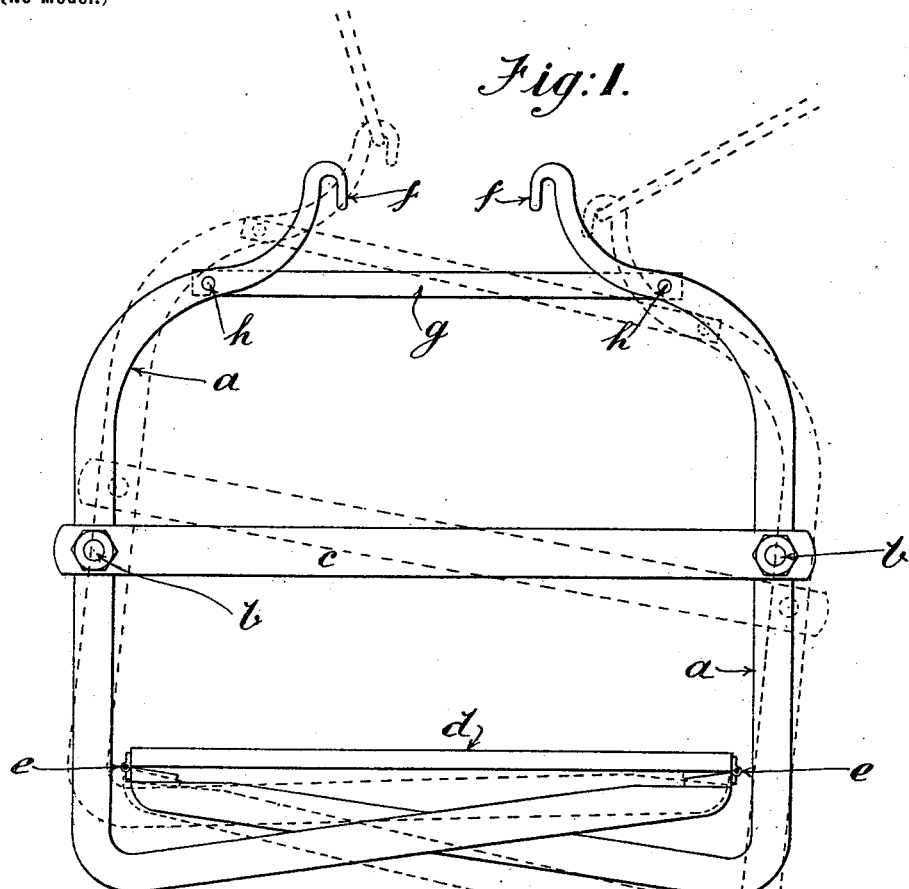
Figure 2:
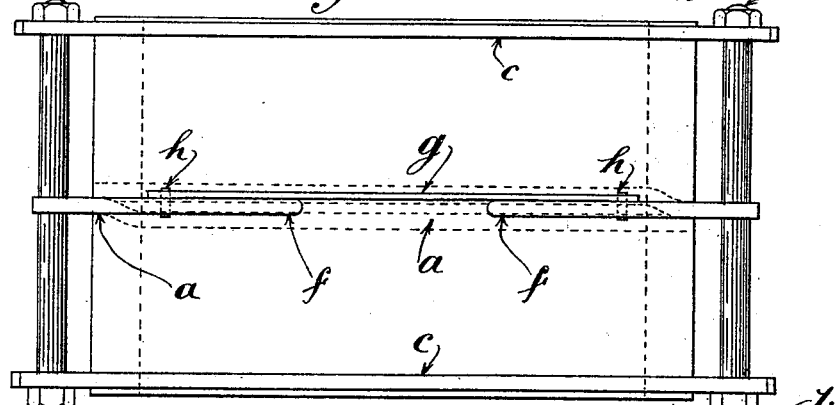

Figure 1 is a side elevation showing my invention; Fig. 2, a plan view of same.

Referring to the drawings, the bent arms or levers $a$ are pivoted at $b$ to the bar $c$. The platform $d$ is pivotally attached to the ends of the bent levers $a$ at $e$. $f$ are hooks or such convenient means of attachment for the ropes or suspending medium. It will be seen that a differentiation of strain between the hooks $f$ will cause the platform $d$ to remain in a nearly horizontal position. $g$ is a bar pivotally connected to the levers $a$ at $h$.

In the present method of hanging cages two ropes or chains are employed, which are parallel to one another, and these ropes have to be operated simultaneously when it is required to raise or lower the platform or cage and at the same time maintain it in a horizontal position, thus limiting the movement or travel of the platform or cage, whereas by my invention the distance between the points of support or suspension of the ropes or chains may be varied according to the width of the building or other position in which they are employed, so that when the suspending ropes or chains are placed in position the platform or cage may be moved across the distance between such points of suspension or support without materially altering the angle of the platform or cage on which the individual or individuals are carried, thus facilitating the work to be done and obviating the removal from place to place of the supporting or suspension mechanism of the platform or cage, as the whole is so arranged that the points of support or suspension need not be altered until the required work is carried out. The bent levers or bars are at an angle less than a right angle in order to allow of the required movement.

Having thus described my invention, what I claim, and desire to secure by Letters Patent, is—

In slinging and shifting cradles in combination a platform or surface, two levers or bars bent so as to form an angle more acute than a right angle one end of said bars being attached to the platform or cage by means of hinges or the like and terminating at their other ends in hooks for attachment to cables or chains: a connecting-bar pivotally attached to said bent bars or levers for maintaining the same in position, substantially as described and illustrated herein and for the purpose set forth.

In testimony that I claim the foregoing I have hereunto set my hand this 16th day of December, 1898.

FR. KNOEFERL.

Witnesses:
 BENJAMIN CLARK,
 WILLIAM JOHN WEEKS.